(12) United States Patent
Brown

(10) Patent No.: US 7,979,323 B2
(45) Date of Patent: Jul. 12, 2011

(54) EXCHANGING RETAIL PRICING INFORMATION

(75) Inventor: Jack Brown, Edmond, OK (US)

(73) Assignee: Retail Insight, LLC, Oklahoma City, OK (US)

( * ) Notice: Subject to any disclaimer, the term of this patent is extended or adjusted under 35 U.S.C. 154(b) by 1221 days.

(21) Appl. No.: 11/621,004

(22) Filed: Jan. 8, 2007

(65) Prior Publication Data

US 2008/0168008 A1 Jul. 10, 2008

(51) Int. Cl.
*G06Q 30/00* (2006.01)
(52) U.S. Cl. ........................... 705/27.1; 705/26.1
(58) Field of Classification Search ............ 705/26, 705/27

See application file for complete search history.

(56) References Cited

U.S. PATENT DOCUMENTS

| | | |
|---|---|---|
| 2002/0026358 A1 | 2/2002 | Miller et al. |
| 2003/0074206 A1 | 4/2003 | Hoffman et al. |
| 2005/0055288 A1 | 3/2005 | Bevente et al. |
| 2007/0299743 A1 * | 12/2007 | Staib et al. .......... 705/27 |

OTHER PUBLICATIONS

Stafford: "Delivering Handheld Retail Solutiions," Computer Reseller News, Jul. 26, 1999; Dialog file 9 #01901310, 2pgs.*
International Preliminary Report on Patentability under Chapter I issued in corresponding International Application No. PCT/US2008/050266 on Jul. 14, 2009; 7 pages.
Notification of Transmittal of The International Search Report and The Written Opinion of the International Searching Authority of Application No. pct/us08/50266, Filed Jan. 4, 2008 and mailed Nov. 3, 2008 (11 pages).

* cited by examiner

*Primary Examiner* — Robert M. Pond
(74) *Attorney, Agent, or Firm* — Fish & Richardson P.C.

(57) ABSTRACT

The present disclosure includes a method for providing pricing information. In some implementations, a method for providing pricing information includes receiving, from a first subscriber, a request for pricing information of one or more retailers. The request is associated with a unit provided by a retailer different from the one or more retailers. Pricing information associated with the unit is identified based on mapping information. The pricing information is provided by the one or more retailers. The mapping information maps the unit to one or more units sold by the one or more retailers.

17 Claims, 12 Drawing Sheets

Figure 3C

RetailerStore (310j)

| Column Name | Data Type | Allow Nulls |
|---|---|---|
| RtlrID | char(10) | |
| RtlrStoreID | char(10) | |
| RtlrPriceGroup | char(4) | ¤ |
| RtlrStoreName | char(30) | ¤ |
| RtlrStoreAddress1 | char(50) | ¤ |
| RtlrStoreAddress2 | char(50) | ¤ |
| RtlrStoreCity | char(50) | ¤ |
| RtlrStoreState | char(2) | ¤ |
| RtlrStoreZip | char(10) | ¤ |
| RtlrStoreMsa | char(5) | ¤ |

FK_RetailerStore (312f) — C

RetailerSubscriptions (310k)

| Column Name | Data Type | Allow Nulls |
|---|---|---|
| RtlrID | char(10) | |
| RetailerXID | char(10) | |
| RtlrSubscriptionBeginDate | smalldatetime | |
| RtlrSubscriptionEndDate | smalldatetime | ¤ |
| RtlrSubscriptionRate | smallmoney | ¤ |

FK_Retailer Subscriptions_Retailer (312g) — D

RetailerType (310l)

| Column Name | Data Type | Allow Nulls |
|---|---|---|
| RtlrType | char(10) | |
| RtlrTypeDescription | varchar(30) | |

FK_Retailer_Type (312h) — E

RetailerUser (310m)

| Column Name | Data Type | Allow Nulls |
|---|---|---|
| RtlrID | char(10) | |
| RtlrUserID | char(10) | |
| RtlrUserPassword | char(10) | |
| RtlrUsername | varchar(20) | |
| RtlrUserEmail | varchar(30) | |

FK_Retailer User_RtlrID (312i) — F

RetailerStorePrice (310n)

| Column Name | Data Type | Allow Nulls |
|---|---|---|
| RtlrID | char(10) | |
| RtlrStoreID | char(10) | |
| RtlrSku | char(20) | |
| RtlrSkuPrice | smallmoney | |
| RtlrSkuPriceDate | smalldatetime | |

FK_RetailerStore SkuPrices_RtlrID (312j) — G

Figure 4D

| Price Retriever Application | | | | | | | | | | | | | | | | |
|---|---|---|---|---|---|---|---|---|---|---|---|---|---|---|---|---|
| Product | | | | | | | | | | | | | | | | |
| Level | O'Reilly Auto Parts -- 10-21-2006 | | | Advance Auto Parts -- 10-24-2006 | | | | AutoZone Auto Parts -- 10-23-2006 | | | | CSK Auto | | | | |
| | Price | # Stores | Part # | Brand | | | | | Price | # Stores | Part # | Brand | Price | # Stores | | | |
| 1 | $99.99 | 1391 | 01-1108X | BESTEST | | | | | $90.99 | 210 | 1650-6-5 | ValuCraft | $90.99 | 210 | | | |
| | $109.99 | 216 | 01-1108X | BESTEST | | | | | $94.99 | 1270 | 1650-6-5 | ValuCraft | $94.99 | 127 | | | |
| | | | | | | | | | $99.99 | 821 | 1650-6-5 | ValuCraft | $99.99 | 821 | | | |
| | | | | | | | | | $100.06 | 2 | 1650-6-5 | ValuCraft | $100.06 | 2 | | | |
| | | | | | | | | | $104.46 | 25 | 1650-6-5 | ValuCraft | | | | | |
| | | | | | | | | | $104.99 | 172 | 1650-6-5 | ValuCraft | | | | | |
| | | | | | | | | | $109.15 | 5 | 1650-6-5 | ValuCraft | | | | | |
| | | | | | | | | | $109.96 | 7 | 1650-6-5 | ValuCraft | | | | | |
| | | | | | | | | | $109.99 | 982 | 1650-6-5 | ValuCraft | | | | | |
| | | | | | | | | | $113.96 | 12 | 1650-6-5 | ValuCraft | | | | | |
| | | | | | | | | | $114.99 | 314 | 1650-6-5 | ValuCraft | | | | | |
| | Price | # Stores | Part # | Brand | Price | # Stores | Part # | Brand | Price | # Stores | Part # | Brand | Price | # Stores | | | |
| 2 | $109.99 | 1228 | 01-1108 | ULTIMA | $108.88 | 983 | P8206-5 | PALLADIUM | $99.99 | 1391 | 01-1108X | BESTEST | $90.99 | 210 | | | |
| | $114.99 | 227 | 01-1108 | ULTIMA | $114.44 | 1210 | P8206-5 | PALLADIUM | $109.99 | 216 | 01-1108X | BESTEST | $94.99 | 127 | | | |
| | $119.99 | 3 | 01-1108 | ULTIMA | $124.44 | 265 | P8206-5 | PALLADIUM | | | | | $99.99 | 821 | | | |
| | $124.99 | 80 | 01-1108 | ULTIMA | $193.22 | 36 | | | | | | | $100.06 | 2 | | | |
| | | | | | | | | | | | | | $104.46 | 25 | | | |
| | | | | | | | | | | | | | $104.99 | 172 | | | |
| | | | | | | | | | | | | | $109.15 | 5 | | | |
| | | | | | | | | | | | | | $109.96 | 7 | | | |
| | | | | | | | | | | | | | $109.99 | 982 | | | |
| | | | | | | | | | | | | | $113.96 | 12 | | | |
| | | | | | | | | | | | | | $114.99 | 314 | | | |

Figure 4E

Price Retriever Application

| Price | Part # | Price | Brand | Warranty | Store | City | State | Zip | Phone | MSA |
|---|---|---|---|---|---|---|---|---|---|---|
| O'Reilly Auto Parts | 01-1108 | $109.99 | ULTIMA | LT | 1038 | CULLMAN | AL | 35055 | 2567344547 | MSA |
| O'Reilly Auto Parts | 01-1108 | $109.99 | ULTIMA | LT | 1041 | DECATUR | AL | 35056 | 2567344548 | MSA |
| O'Reilly Auto Parts | 01-1108 | $109.99 | ULTIMA | LT | 1044 | TUSCALOOSA | AL | 35057 | 2567344549 | MSA |
| O'Reilly Auto Parts | 01-1108 | $109.99 | ULTIMA | LT | 1047 | OZARK | AL | 35058 | 2567344550 | MSA |
| O'Reilly Auto Parts | 01-1108 | $109.99 | ULTIMA | LT | 1050 | CULLMAN | AL | 35059 | 2567344551 | MSA |
| O'Reilly Auto Parts | 01-1108 | $109.99 | ULTIMA | LT | 1053 | CULLMAN | AL | 35060 | 2567344552 | MSA |
| O'Reilly Auto Parts | 01-1108 | $109.99 | ULTIMA | LT | 1056 | DECATUR | AL | 35061 | 2567344553 | MSA |
| O'Reilly Auto Parts | 01-1108 | $109.99 | ULTIMA | LT | 1059 | TUSCALOOSA | AL | 35062 | 2567344554 | MSA |
| O'Reilly Auto Parts | 01-1108 | $109.99 | ULTIMA | LT | 1062 | OZARK | AL | 35063 | 2567344555 | MSA |
| O'Reilly Auto Parts | 01-1108 | $109.99 | ULTIMA | LT | 1065 | CULLMAN | AL | 35064 | 2567344556 | MSA |
| O'Reilly Auto Parts | 01-1108 | $109.99 | ULTIMA | LT | 1068 | CULLMAN | AL | 35065 | 2567344557 | MSA |
| O'Reilly Auto Parts | 01-1108 | $109.99 | ULTIMA | LT | 1071 | DECATUR | AL | 35066 | 2567344558 | MSA |
| O'Reilly Auto Parts | 01-1108 | $109.99 | ULTIMA | LT | 1074 | TUSCALOOSA | AL | 35067 | 2567344559 | MSA |
| O'Reilly Auto Parts | 01-1108 | $109.99 | ULTIMA | LT | 1077 | OZARK | AL | 35068 | 2567344560 | MSA |
| O'Reilly Auto Parts | 01-1108 | $109.99 | ULTIMA | LT | 1080 | CULLMAN | AL | 35069 | 2567344561 | MSA |
| O'Reilly Auto Parts | 01-1108 | $109.99 | ULTIMA | LT | 1083 | CULLMAN | AL | 35070 | 2567344562 | MSA |
| O'Reilly Auto Parts | 01-1108 | $109.99 | ULTIMA | LT | 1086 | DECATUR | AL | 35071 | 2567344563 | MSA |
| O'Reilly Auto Parts | 01-1108 | $109.99 | ULTIMA | LT | 1089 | TUSCALOOSA | AL | 35072 | 2567344564 | MSA |
| O'Reilly Auto Parts | 01-1108 | $109.99 | ULTIMA | LT | 1092 | OZARK | AL | 35073 | 2567344565 | MSA |
| O'Reilly Auto Parts | 01-1108 | $109.99 | ULTIMA | LT | 1095 | CULLMAN | AL | 35074 | 2567344566 | MSA |

Figure 4F

Price Retriever Application

| Retailer | Part # | Brand | Zip | Phone | ORA | ADV | AZ | CSK | PEP |
|---|---|---|---|---|---|---|---|---|---|
| O'Reilly Auto Parts | 01-1108X | BESTEST | 27445 | 3361428571 | 99.99 | 0.00 | 94.99 | 0.00 | 0.00 |
| O'Reilly Auto Parts | 01-1108X | BESTEST | 27446 | 3361428572 | 99.99 | 0.00 | 95.99 | 0.00 | 0.00 |
| O'Reilly Auto Parts | 01-1108X | BESTEST | 27447 | 3361428573 | 99.99 | 0.00 | 96.99 | 0.00 | 0.00 |
| O'Reilly Auto Parts | 01-1108X | BESTEST | 27448 | 3361428574 | 99.99 | 0.00 | 97.99 | 0.00 | 0.00 |
| O'Reilly Auto Parts | 01-1108X | BESTEST | 27449 | 3361428575 | 99.99 | 0.00 | 98.99 | 0.00 | 0.00 |
| O'Reilly Auto Parts | 01-1108X | BESTEST | 27450 | 3361428576 | 99.99 | 0.00 | 99.99 | 0.00 | 0.00 |
| O'Reilly Auto Parts | 01-1108X | BESTEST | 27451 | 3361428577 | 99.99 | 0.00 | 100.99 | 0.00 | 0.00 |
| O'Reilly Auto Parts | 01-1108X | BESTEST | 27452 | 3361428578 | 99.99 | 0.00 | 101.99 | 0.00 | 0.00 |
| O'Reilly Auto Parts | 01-1108X | BESTEST | 27453 | 3361428579 | 99.99 | 0.00 | 102.99 | 0.00 | 0.00 |
| O'Reilly Auto Parts | 01-1108X | BESTEST | 27454 | 3361428580 | 99.99 | 0.00 | 103.99 | 0.00 | 0.00 |
| O'Reilly Auto Parts | 01-1108X | BESTEST | 27455 | 3361428581 | 99.99 | 0.00 | 104.99 | 0.00 | 0.00 |
| O'Reilly Auto Parts | 01-1108X | BESTEST | 27456 | 3361428582 | 99.99 | 0.00 | 105.99 | 0.00 | 0.00 |
| O'Reilly Auto Parts | 01-1108X | BESTEST | 27457 | 3361428583 | 99.99 | 0.00 | 106.99 | 0.00 | 0.00 |
| O'Reilly Auto Parts | 01-1108X | BESTEST | 27458 | 3361428584 | 99.99 | 0.00 | 107.99 | 0.00 | 0.00 |
| O'Reilly Auto Parts | 01-1108X | BESTEST | 27459 | 3361428585 | 99.99 | 0.00 | 108.99 | 0.00 | 0.00 |
| O'Reilly Auto Parts | 01-1108X | BESTEST | 27460 | 3361428586 | 99.99 | 0.00 | 109.99 | 0.00 | 0.00 |
| O'Reilly Auto Parts | 01-1108X | BESTEST | 27461 | 3361428587 | 99.99 | 0.00 | 110.99 | 0.00 | 0.00 |
| O'Reilly Auto Parts | 01-1108X | BESTEST | 27462 | 3361428588 | 99.99 | 0.00 | 111.99 | 0.00 | 0.00 |
| O'Reilly Auto Parts | 01-1108X | BESTEST | 27463 | 3361428589 | 99.99 | 0.00 | 112.99 | 0.00 | 0.00 |
| O'Reilly Auto Parts | 01-1108X | BESTEST | 27464 | 3361428590 | 99.99 | 0.00 | 113.99 | 0.00 | 0.00 |

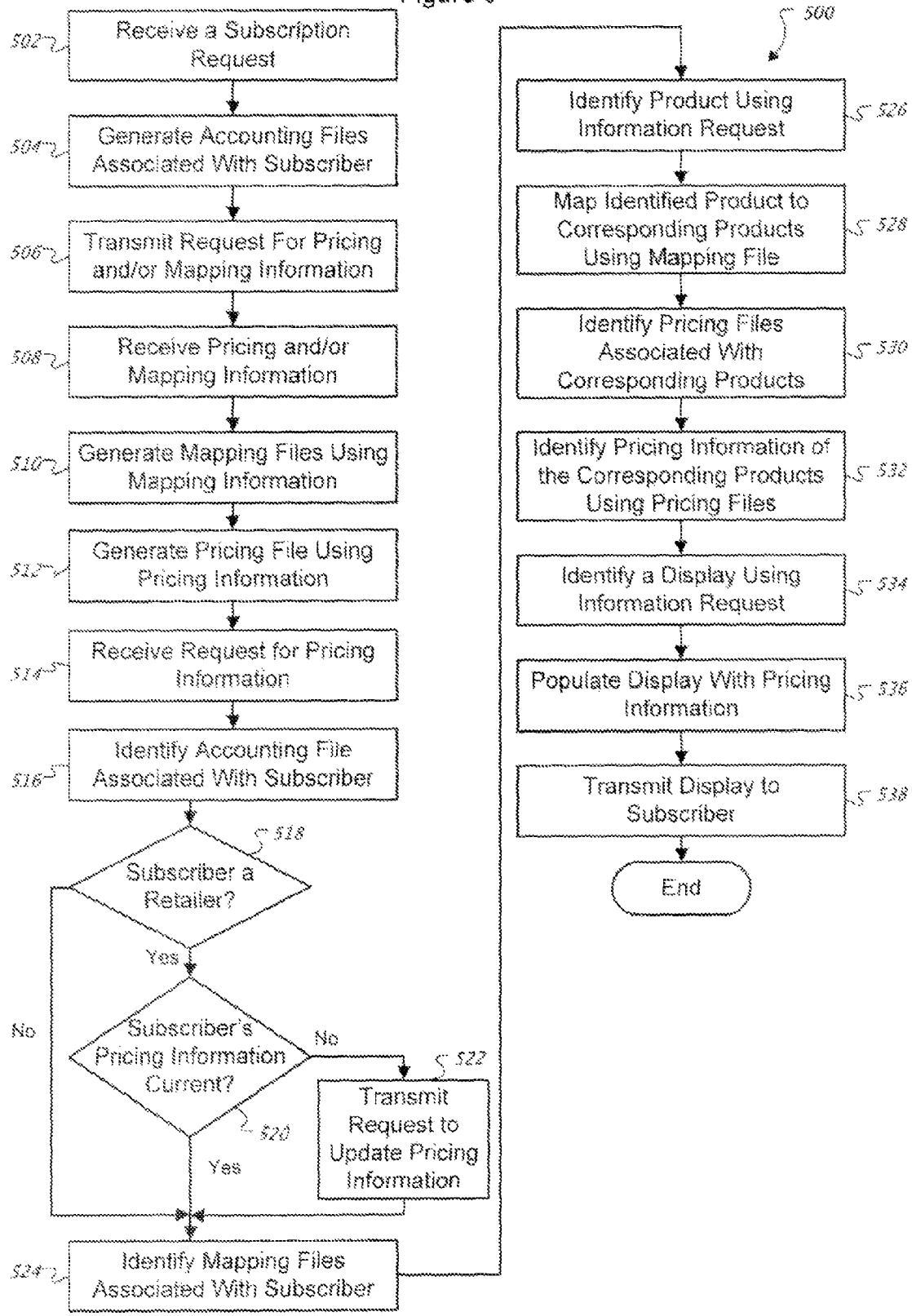

EXCHANGING RETAIL PRICING INFORMATION

TECHNICAL FIELD

This invention relates to retail pricing and, more particularly, to exchanging retail pricing information.

BACKGROUND

A competitor's publicly available product or service prices are public information and can be determined by any competitors using a number of methods. For example, they can be determined by calling stores, visiting stores, or searching competitor's Internet websites. Competitors have a long history of gathering these publicly available prices. Gathering publicly available pricing information by the above mentioned methods can be expensive and inefficient.

SUMMARY

The present disclosure includes a method for providing pricing information. In some implementations, a method for providing pricing information includes receiving, from a first subscriber, a request for pricing information of one or more retailers. The request is associated with a unit provided by a retailer different from the one or more retailers. Pricing information associated with the unit is identified based on mapping information. The pricing information is provided by the one or more retailers. The mapping information maps the unit to one or more units sold by the one or more retailers.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A to 4F are example displays for providing pricing information by the pricing system of FIG. 2 in accordance with some implementations; and FIG. 5 is a flow chart illustrating an example method for providing pricing information in accordance with some implementations of the present disclosure.

DETAILED DESCRIPTION

Figure 1:
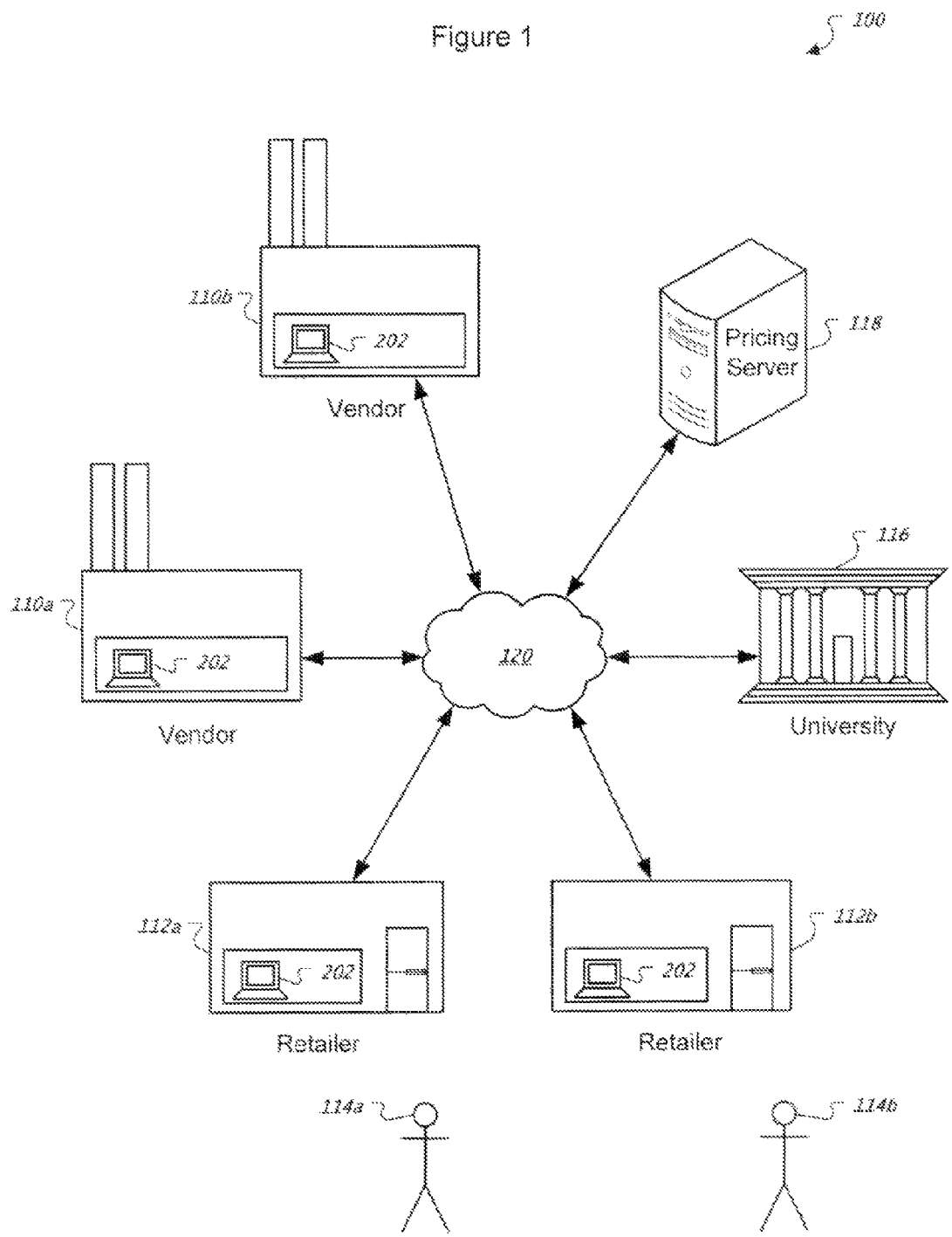
FIG. 1 is a block diagram illustrating a system in accordance with some embodiments of the present disclosure.

FIGS. 1A and 1B are diagrams illustrating a pricing system 100 including various example business and educational entities involved in evaluating retail pricing information. For instance, pricing information may include one or more of the following: product identification, part number, retail price, number of items per unit, quality level (e.g., low, good, best), retail address, manufacturer, a Stock Keeping Unit (SKU), or any other information associated with a billable entity. A SKU is an identifier (e.g., alphanumeric string) typically used by retailers to track billable units provided to the customer. A billable unit may be a physical item, a non-physical item (e.g., service, extended warranty, delivery fee, installation fee), or a combination of the foregoing. For example, a SKU may identify a package of twenty spark plugs sold by a specific retailer. In some implementations, a SKU may identify a physical item in combination with a non-physical item such as a warranty. Often, retailers and/or vendors collect publicly available pricing information of their competitors to evaluate their current pricing strategies. For Example, these entities may and/or hire a third party to call, physically visit stores, and/or view online Websites to collect this publicly available pricing information. In very competitive business spaces such as automotive parts, business entities may be frequently or constantly monitoring pricing information. In doing so, the cost and/or time associated with collecting the pricing information may be expensive and/or inefficient. To avoid, reduce, or minimize such inefficiencies, pricing system 100 may share publicly available pricing information between competitors using pricing information provide by the retailers. For example, pricing system 100 may receive publicly available pricing information from each participating retailer and provide pricing information of competitors in response to a request. In some implementations, system 100 may receive a request for pricing information identifying a requesting retailers product and provide pricing information associated with competitor products using the identified retailer product. For example, the requesting retailer may provide information that maps the retailer product to competitor products. In this case, system 100 may using mapping information to identify pricing information of competitors. In short, system 100 may perform one or more of the following processes: receive pricing information and mapping information associated with retailers and provide pricing information to competitors using mapping information.

At a high level, the illustrated system 100 may include, in some implementations, vendors 110, retailers 112, customers 114, a university 116, and a mapping server 118 coupled through network 120. Of course, this illustration is for readability purposes only and system 100 may include other elements and/or different elements involved in evaluating pricing information as appropriate. Vendor 110 is generally an entity that manufacturers articles, products, or other commodities to sell and/or use. For example, manufacturer 100 may manufacture chemical products to sell to other entities such as vendor 110, retailer 112, or buyer 114. Vendor 110 may engage in the production, preparation, propagation, compounding, conversion, or processing of products. In some instances, vendor 110 transforms, by means of tools and/or processing steps (e.g., chemical reactions), raw materials into products for sale. Vendor 110 may include one or more manufacturing facilities located at a single geographic location as well as one or more remotely distributed manufacturing facilities. In connection with manufacturing products, vendor 110 may be, include, provide, or otherwise associated with any entity that distributes the products to retailers 112. Typically, vendor 110 does not directly market, sell or otherwise provide products to buyer 114 but, instead, provides the products to retailers 112. Vendors 110 may provide one or more of the following services associated with the product: inventory, warehousing, distribution, and/or transportation. Since vendor 110 may not immediately distribute products received from vendor 110, vendor 110 may store or otherwise retain the received products for a period of time.

Retailer 112 is an entity that typically provides products and/or services directly to buyer 114. In some instances, retailer 112 buys or otherwise receives products from vendor 110 and then may sell these products to buyer 114. As with vendor 110, retailer 112 may provide one or more of the following services associated with the product: inventory, warehousing, distribution, and/or transportation. As a result, retailer 112 may not immediately distribute products received from vendor 110. Retailer 112 may include a single retail facility, one or more retail facilities at a single geographic location, and/or a plurality of retail facilities geographically distributed. In some cases, two or more of the illustrated entities may represent portions of the same legal entity or affiliates. For example, retailer 112a and retailer 112b may be departments within one company. Buyer 114 comprises any suitable individual or enterprise that consumes or otherwise uses products and/or services provided in system 100. Typically, buyer 114 is an enterprise who acquires or imports products and/or associated services for consumption, use, or enjoyment.

University 116 includes any suitable public and/or private education institution that may educate and/or perform academic research in economics. Typically, university 116 is a public university that educates college and/or graduate level students and may also conduct research in one or more academic fields (e.g., economics). In the economics example, university 116 may be collect and/or evaluate pricing information of retailers 112 in educating students and/or conducting research. In this case, system 100 may provide the retailer pricing information to university 116. In doing so, university 116 may assist in preparing college students for their professional careers and/or assist in the development of economic sciences.

Mapping server 118 comprises an electronic computing device operable to receive, transmit, process and store pricing information associated with system 100. System 100 can be implemented using computers other than servers, as well as a server pool. Indeed, mapping server 118 may be any computer, electronic or processing device such as, for example, a blade server, general-purpose personal computer (PC), Macintosh, workstation, Unix-based computer, or any other suitable device. In other words, system 100 may include computers other than general purpose computers as well as computers without conventional operating systems. Mapping server 118 may be adapted to execute any operating system including Linux, UNIX, Windows Server, or any other suitable operating system. In the illustrated implementation, mapping server 118 is coupled to vendors 110, retailers 112, and university 116 through network 120 and may provide pricing information to these elements.

As discussed in more detail below in regards to FIG. 2, mapping server 118 may receive publicly available pricing information from participating retailers 112. In addition to pricing information, mapping server 118 may receive one or more data elements and/or directives for mapping retailer products to products sold by competitors. In some implementations, each retailer 112 provides mapping information to mapping server 118. In this case, the mapping information may be unique for each retailer 112. For example, mapping information from retailer 112a may map a first product to second and third product sold by retailer 112b. In contrast, the mapping information from retailer 112b may not map the second product to the first product sold by the retailer 112a. In some implementations, mapping server 118 prevents or otherwise denies access to competitor's mapping information. In other words, mapping server 118 may only grant retailer 112 that generated to the mapping information access to that mapping information. In addition to mapping information provided by retailers 112, vendors 110 and university 116 may also provide mapping information used to identify pricing information associated with retailers 112.

Network 120 facilitate wireless or wireline communication between server 118 and any other local or remote computer, such as vendors 110, retailers 112, and/or university 116. Network 120 may be all or a portion of an enterprise or secured network. While illustrated as single network, network 120 may be a continuous network logically divided into various sub-nets or virtual networks without departing from the scope of this disclosure, so long as at least portion of network 120 may facilitate communications of pricing information between server 118 and at least one of vendors 110, retailers 112, and/or university 116. In some implementations, network 120 encompasses any internal or external network, networks, sub-network, or combination thereof operable to facilitate communications between various computing components in system 100. Network 120 may communicate, for example, Internet Protocol (IP) packets, Frame Relay frames, Asynchronous Transfer Mode (ATM) cells, voice, video, data, and other suitable information between network addresses. Network 120 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, retailers 112 transmit pricing information to mapping server 118. In connection with the pricing information, vendors 110, retailers 112, and/or university 116 may transmit pricing information to mapping server 118 through network 120. While such pricing information is frequently transmitted to mapping server 118, vendors 110, retailers 112, and/or university 116 may provide pricing information using other process such as providing magnetic tapes, Compact Discs (CDs), Digital Video Discs (DVDs), or other elements for facilitating the exchange of information. In response to a request for pricing information, mapping server 118 may identifier the type of request element (e.g., vendor, retailer, educational). In the case of a retailer, mapping server 118 may verify or otherwise determine pricing information associated with the requesting retailer 112 is valid. For example, mapping server 118 may determine is the associated pricing information has violated a threshold (e.g., time period). In response to a violation, mapping server 118 may transmit a request to update the associated pricing information. In the event that mapping server 118 grants access to pricing information, mapping server 118 may identify a product information (e.g., SKU) using the request and mapping information associated with the requesting network element. Using the identified mapping information, mapping server 118 may identify pricing information associated with one or more retailers and transmits the identified pricing information to the request network element such as a competing retailer 112.

Figure 2:
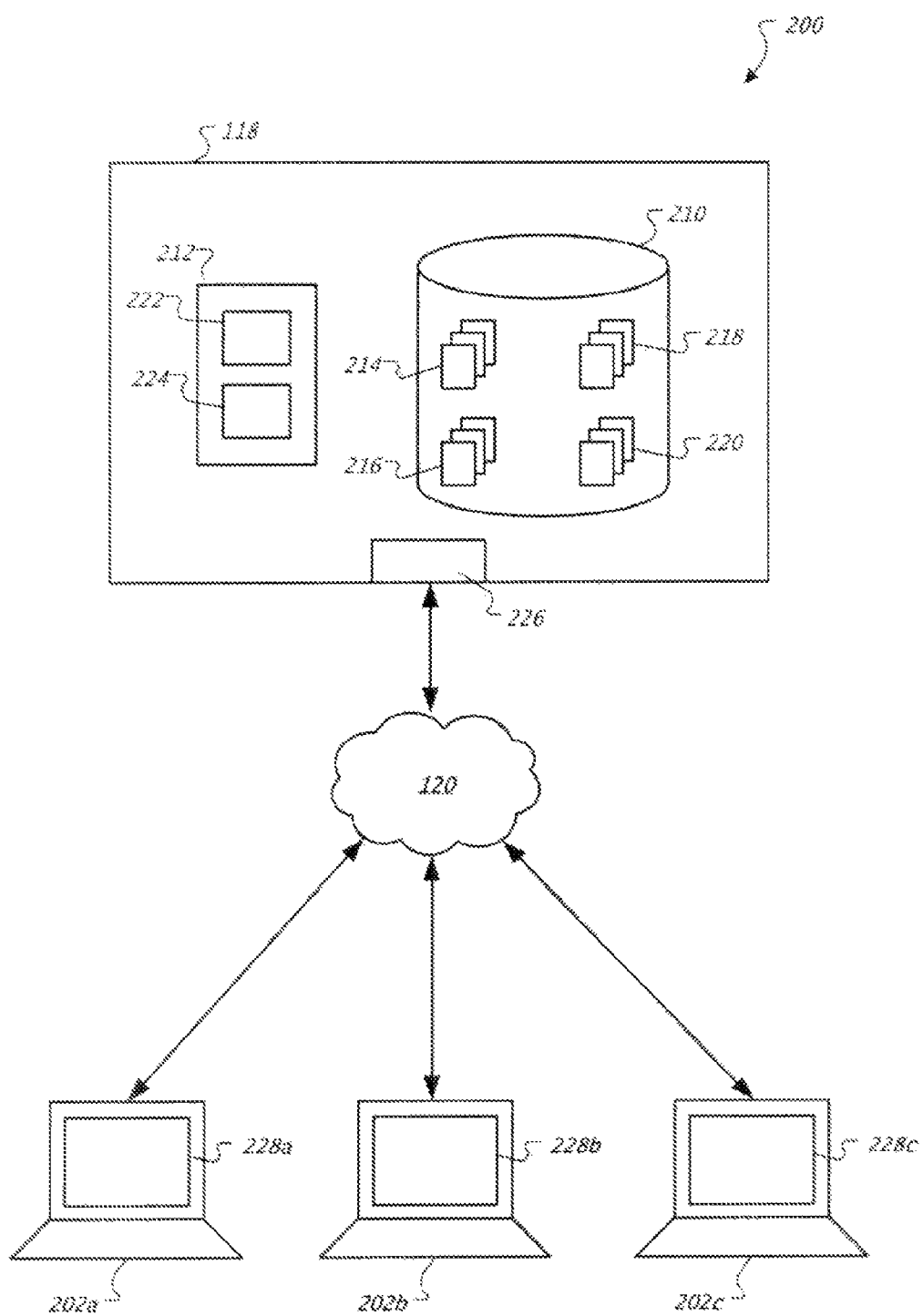
FIG. 2 is a block diagram illustrating an example pricing system for evaluating pricing information in accordance with some implementations of the present disclosure.

FIG. 2 illustrates a mapping system 200 for mapping units between different retailers 112 in accordance with one embodiment of the present disclosure. As mentioned above, system 200 may automatically provide publicly available pricing information to subscribers 210 in accordance with their mapping information. For example, a subscriber 210 may transmit a request for current pricing information associated with a unit identified by the requesting subscriber 210, and in response to the request system 200 may identify pricing information for competing units using mapping information provided by the requesting subscriber 210. In some implementations, each subscriber 210 may provide their mapping information independent of other subscribers. For instances, each subscriber 210 may only have access to their mapping information and be unable to access mapping information provided by other subscribers 210.

At a high level, system 200 includes mapping server 118 and subscribers 210. In some implementations, mapping server 118 includes memory 210 and a processor 212. Memory 210 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, memory 210 includes pricing files 214, mapping files 216, subscriber files 218, and display files 220. Here, pricing files 214 refer to one or more electronic files for storing or otherwise identifying pricing information associated with retailers 112 of FIG. 1. Local memory 210 may also include any other appropriate data such as Virtual Private Network (VPN) applications or services, firewall policies, a security or access log, print or other reporting files, Hyper-Text Markup Language (HTML) files or templates, data classes or object interfaces, child software applications or sub-systems, and others.

Pricing files 214 includes one or more data structures or entries for storing or otherwise identifying pricing information associated with retailers 112. As discussed above, pricing files 214 may include or otherwise identify one or more of the following parameters associated with a unit for sale by retailer 112: product identification, unit number, category (e.g., mechanical, electrical, automotive), sub-category, retailer information (e.g., address, phone number, store number), location information (e.g., county, city, state), retailer type (e.g., automotive, hardware), date, number of items per unit, quality level (e.g., low, good, best), retail address, availability (e.g., number of stocked units), manufacturer, a brand name, a SKU, a warranty period, and/or any other information associated with the billable unit. For example, pricing file 214 may identify a package of spark plugs, six items in the unit, a one year warranty, $11.99, and other parameters associated with the packaged spark plugs. In the case that the pricing information includes a category, pricing file 214 may also identify a sub-category associated with the category. For example, pricing file 214 may identify the category as rotating electrical and a sub-category as an alternator. In some implementations, pricing files 214 only includes information that is available to the public (e.g., buyer 114) and, as a result, system 100 only provides information that retailers 112 disclose to the public. Each pricing file 214 may be associated with a specific retailer 112, a franchise including a plurality of retailers 112, and/or a plurality of pricing files 214 may be associated with a single retailer 112. In some implementations, pricing file 214 may identify pricing information for a unit at a specific retailer location. In other words, pricing file 214 may identify pricing information for a unit at a specific address. Alternatively or in combination, pricing file 214 may identify pricing information for a unit that applies franchise wide. In certain implementations, pricing files 214 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular pricing file 214 may merely be a pointer to a third party pricing file stored remotely. In short, pricing files 214 may comprise one table or file or a plurality of tables or files stored on one computer or across a plurality of computers in any appropriate format. Indeed, some or all of pricing files 214 may be local or remote without departing from the scope of this disclosure and store any type of appropriate data.

Mapping file 216 includes instructions, data mappings, algorithms, or any other directive used by mapping server 118 to map a unit sold by one retailer 112 to one or more units sold by one or more different retailers 112. For example, mapping file 216 may map a unit to one or more units sold by a competitor. In some implementations, mapping file 216 maps units that serve substantially the same purpose. For example, mapping file 216 may map a replacement part (e.g., automotive) to substantially equivalent replacement parts sold by one or more competitor. In some implementations, mapping file 216 maps a retailer's unit to units having different quality levels. For example, mapping file 216 may map a replacement part to three substantially equivalent replacement parts sold by a competitor. In this case, the three identified replacement parts may each be associated with different quality levels (e.g., low, good, best). Alternatively or in combination, the mapping file 216 may map a unit sold by a retailer 112 to units that have the same or different brand names. Mapping file 216 may be nay suitable format such as, for example, an XML document, a flat file, CSV file, a name-value pair file, SQL table, an array, an object, or others. Mapping file 216 may be any suitable data structure such as an array, matrix, list, table, or any other suitable structure that maps a unit sold by a first retailer 112 to one or more units sold by one or more different retailers 112. Each mapping file 216 may be associated with a subscriber 202 (e.g., a specific retailer 112, a specific vendor 110, university 116, a franchise including a plurality of retailers 112), and/or a plurality of mapping files 216 may be associated with a single subscriber 202. Mapping file 216 may be dynamically created or populated by mapping server 118, a third-party vendor, any suitable user of mapping server 18, loaded from a default file, or received via network 120. The term "dynamically" as used herein, generally means that the appropriate processing is determined at run-time based upon the appropriate information. As mentioned above, mapping file 216 or information included in mapping file 216 is provided by subscriber 202 such as vendors 110, retailers 112, and university 116. In some implementations, mapping file 216 associated with a subscriber 202 includes information that prevents a different subscriber from accessing the associated mapping file 216. In doing so, mapping server 118 may prevent a subscriber 202 from accessing pricing information unless a mapping file 216 has been provided and/or generated for the subscriber 202.

Account files 218 includes one or more data structures or entries for storing or otherwise identifying subscriber information. For example, accounting file 218 may include information associated with a retailer 112. In general, accounting file 218 may include one or more of the following: a subscriber type (e.g., retailer, vendor, educational institution), a user identifier, a password, payment information (e.g., fees, payment history, subscription period), a time period for updating pricing information, a date and/or time of last update, and/or any other information associated with a subscriber 202. Each accounting file 218 may be associated with a subscriber 202, and/or a plurality of accounting file 218 may be associated with a single subscriber 202. Accounting file 218 may be dynamically created or populated by mapping server 118 (e.g., in response to a subscription), a third-party vendor, any suitable user of mapping server 118, loaded from a default file, or received via network 120.

Display pages 220 comprise displays through which information associated with pricing information can be presented to users of subscribers 202. In general, display pages 220 include any machine readable and machine storable work product that may generate or be used to generate a display through Graphical User Interface (GUI) 226 (discussed below). Display pages 220 may be a file, a combination of files, one or more files with embedded links to other files, or any other suitable configuration. Display pages 220 may include text, audio, image, video, animation, and other attributes. In short, display pages 220 comprise any source code or object code for generating a display that provides information for enabling users to evaluate pricing information associated with retailers 112.

Processor 212 executes instructions and manipulates data to perform operations of mapping server 118. Although FIG. 1 illustrates a single processor 212 in server 118, multiple processors 212 may be used according to particular needs, and reference to processor 212 is meant to include multiple processors 212 where applicable. In the illustrated implementation, processor 212 executes request engine 222 and mapping engine 224 at any appropriate time such as, for example, in response to a request or input from a subscriber 202 or any appropriate computer system coupled with network 120. Request engine 222 is any software, for example, operable to provide pricing information to subscriber 202. In general, request engine may perform one or more of the following: verify login information provided by subscriber 202, determine whether pricing information is current, and providing pricing information associated with a retailer using mapping file 216. In regards to login into mapping server 118, request engine 222 may receive a request from subscriber 202 and identify a user identifier and password using the request. In response to at least the request, request engine 222 may identify an accounting file 218 associated with subscriber 202. Using the identified accounting file 218, request engine 222 may verify the identified user identifier and password. In regards to current pricing information, request engine 222 may identify the date that the pricing information was previously updated and period of time for updating the pricing information. In the event that subscriber 202 has violated the time period, request engine 222 may deny access to current pricing information of retailers 112 and/or limit access to previous pricing information. In addition, request engine 222 may identify display pages 220 for presenting pricing information. For example, request engine 222 may receive information identifying one or more units sold by one or more retailers 112. Request engine 222 may receive this information from mapping engine 222 (described below). In response to receiving unit information, request engine 222 may identify one or more pricing files 214 and one or more display pages 220. In some implementations, request engine 222 populates the one or more display pages 220 with the pricing information using pricing files 214. In some implementations, request engine 222 transmits the identified pricing files 214 and the identified display pages 220 to subscriber 224.

Mapping engine 224 is any software, for example, that maps unit sold by one retailer 112 to units sold by one or more different retailers 112. Generally, mapping engine 224 may perform one or more of the following: identify unit information associated with a retailer 112, identify one or more mapping files 216 using the unit information, and map the unit to one or more units sold by a different competitor using the one or more mapping files 216. As for identifying the unit information, mapping engine 224 may receive information identifying a unit from request engine 222. In some implementations, request engine 222 forwards the request to mapping engine 224 and mapping engine 224 identifies the unit information based, at least in part, on the request. Turning to identified mapping files 216, mapping engine 224 may identify an associated retailer 112 and/or a unit identifier (e.g., a SKU) based, at least in part, on the unit information. Mapping engine 224 may identify one or more mapping files 216 associated with the identified retailer 112 and/or the unit identifier. Using the identified mapping files 216, mapping engine 224 may map the unit to one or more units sold by different retailers 112. For example, mapping engine 224 may map the unit to a plurality of units sold by a single or multiple retailers 112, to different units each sold by a different retailer 112, or any other suitable combination of mappings. In response to identifying the corresponding units, mapping engine 224 may forward unit information to request engine 222. Alternatively or in combination, mapping engine 224 may identify pricing files 214 associated with the corresponding units.

Regardless of the particular implementation, "software" may include software, firmware, wired or programmed hardware, or any combination thereof as appropriate. Indeed, request engine 222 and mapping engine 224 may be written or described in any appropriate computer language including C, C++, Java, J#, Visual Basic, assembler, Perl, any suitable version of 4GL, as well as others. While request engine 222 and mapping engine 224 are illustrated in FIG. 1 as including individual modules, each of request engine 222 and mapping engine 224 may include numerous other sub-modules or may instead be a single multi-tasked module that implements the various features and functionality through various objects, methods, or other processes. Further, while illustrated as internal to server 118, one or more processes associated with request engine 222 and/or mapping engine 224 may be stored, referenced, or executed remotely. Moreover, engine 222 and/or mapping engine 224 may be a child or sub-module of another software module or enterprise application (not illustrated) without departing from the scope of this disclosure.

Mapping server 118 may also include interface 226 for communicating with other computer systems, such as subscribers 202, over network 120 in a client-server or other distributed environment. In certain implementations, mapping server 118 receives data from internal or external senders through interface 226 for storage in local memory 210 and/or processing by processor 212. Generally, interface 226 comprises logic encoded in software and/or hardware in a suitable combination and operable to communicate with network 120. More specifically, interface 226 may comprise software supporting one or more communications protocols associated with communications network 120 or hardware operable to communicate physical signals.

Subscribers 202a-c are any devices (e.g., computing devices) operable to connect or communicate with mapping server 118 or network 120 using any communication link. Each subscriber 202 includes, executes, or otherwise presents a Graphical User Interface (GUI) 228 and comprises an electronic device operable to receive, transmit, process and store any appropriate data associated with system 200. While the illustrated implementation includes subscribers 202a-c, system 200 may include any number of subscribers 202 communicably coupled to mapping server 118. Further, "subscriber 202" and "user" may be used interchangeably as appropriate without departing from the scope of this disclosure. Moreover, for ease of illustration, each subscriber 202 is described in terms of being used by one user. But this disclosure contemplates that many users may use one device or that one user may use multiple devices.

As used in this disclosure, a user of subscriber 202 is any person, department, organization, small business, enterprise, or any other entity that may use or request others to use system 200. Subscriber 202 is intended to encompass a personal computer, touch screen terminal, workstation, network computer, kiosk, wireless data port, smart phone, personal data assistant (PDA), one or more processors within these or other devices, or any other suitable processing or electronic device used by a user viewing content from mapping server 118. For example, subscriber 202 may be a PDA operable to wirelessly connect with an external or unsecured network. In another example, subscriber 202 may comprise a laptop that includes an input device, such as a keypad, touch screen, mouse or other device that can accept information, and an output device that conveys pricing information provided by mapping server 118, including digital data, visual information, or GUI 228. Both the input device and output device may include fixed or removable storage media such as a magnetic computer disk, CD-ROM, or other suitable media to both receive input from and provide output to users of subscribers 202 through the display, namely the client portion of GUI 228.

GUI 228 comprises a graphical user interface operable to allow the user of subscriber 202 to interface with at least a portion of system 200 for any suitable purpose, such as viewing advertisements. Generally, GUI 228 provides the particular user with an efficient and user-friendly presentation of data provided by or communicated within system 200. GUI 228 may comprise a plurality of customizable frames or views having interactive fields, pull-down lists, and buttons operated by the user. For example, GUI 228 is operable to present display pages 220 including pricing information in a user-friendly form based on the user context and the displayed data. GUI 228 may also present a plurality of portals or dashboards. GUI 228 can be configurable, supporting a combination of tables and graphs (bar, line, pie, status dials, etc.), and build real-time dashboards, where likelihood indicators 112 (as well the displayed application or transaction data) may be relocated, resized, and such. It should be understood that the term graphical user interface may be used in the singular or in the plural to describe one or more graphical user interfaces and each of the displays of a particular graphical user interface. Therefore, GUI 228 contemplates any graphical user interface, such as a generic web browser or touch screen, that processes information in system 200 and efficiently presents the results to the user. Mapping server 118 can accept data from subscriber 202 via a the web browser (e.g., Microsoft Internet Explorer or Netscape Navigator) and return the appropriate HTML or XML responses to the browser using network 120, such as display pages 220.

In one aspect of operation, subscriber 202 transmits a request for pricing information corresponding to a unit associated with a retailer 112. In response to the request, request engine 222 may identify one or more mapping files 216 associated with subscriber 202. In connection with the request, mapping engine 224 may map the unit to one or more units sold by different retailers 112. In addition, mapping engine 224 may identify pricing files 214 associated with the one or more units and, in turn, may identify pricing information using the identified pricing files 214. Request engine 224 may identify a display page 220 in accordance with the request and may populate the display page 220 with the pricing information. Request engine 224 may transmit the display to subscriber 202 for display through 228. While request engine 224 frequently transmits the pricing information to subscriber 202, request engine 224 may provide pricing information using other processes such as providing magnetic tapes, Compact Discs (CDs), Digital Video Discs (DVDs), or other elements for facilitating the exchange of information.

Figure 3A:
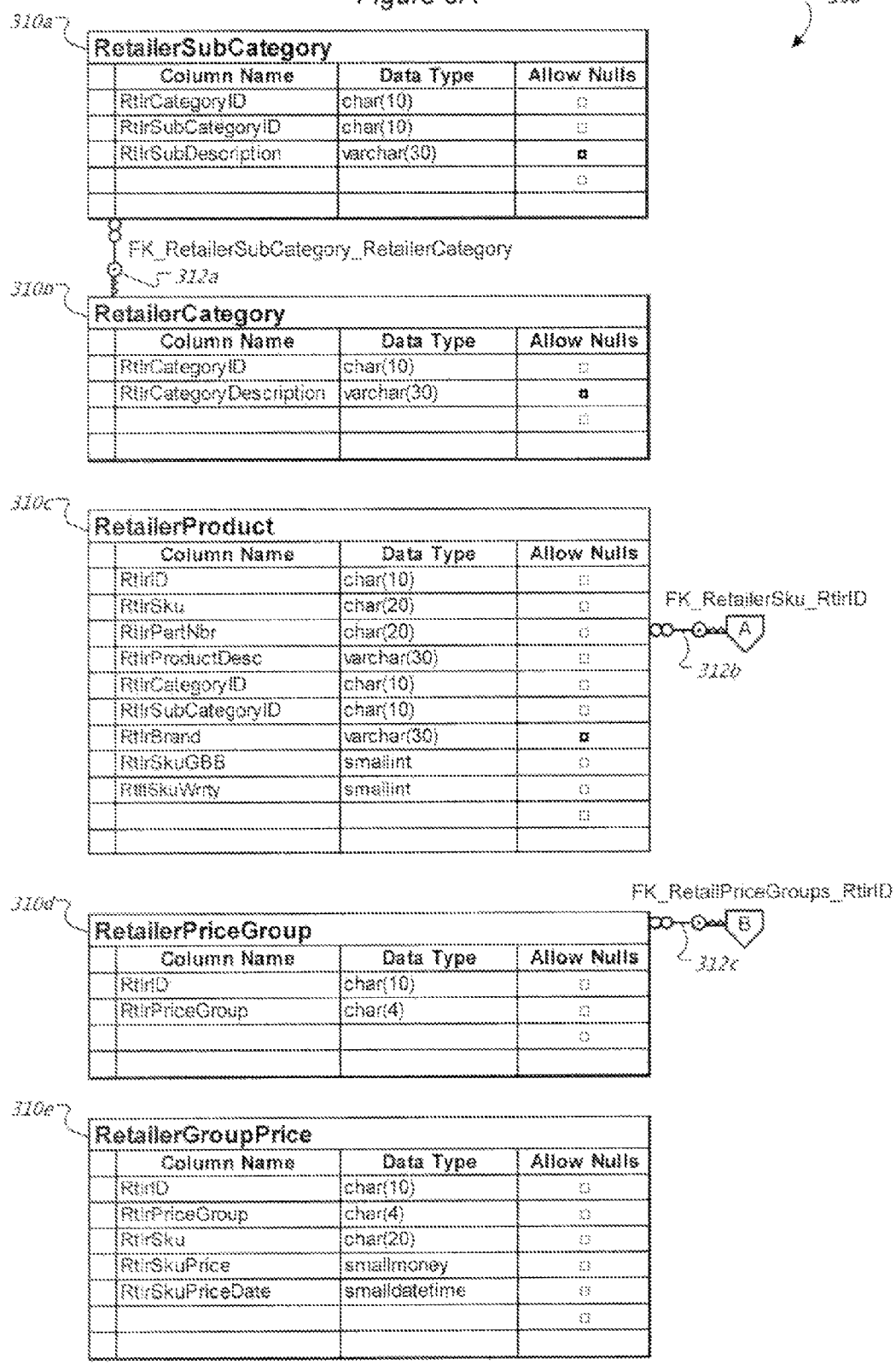
FIG. 3 is an example data schema for storing pricing information in FIG. 2 in accordance with some implementations of the present disclosure.
Figure 3B:
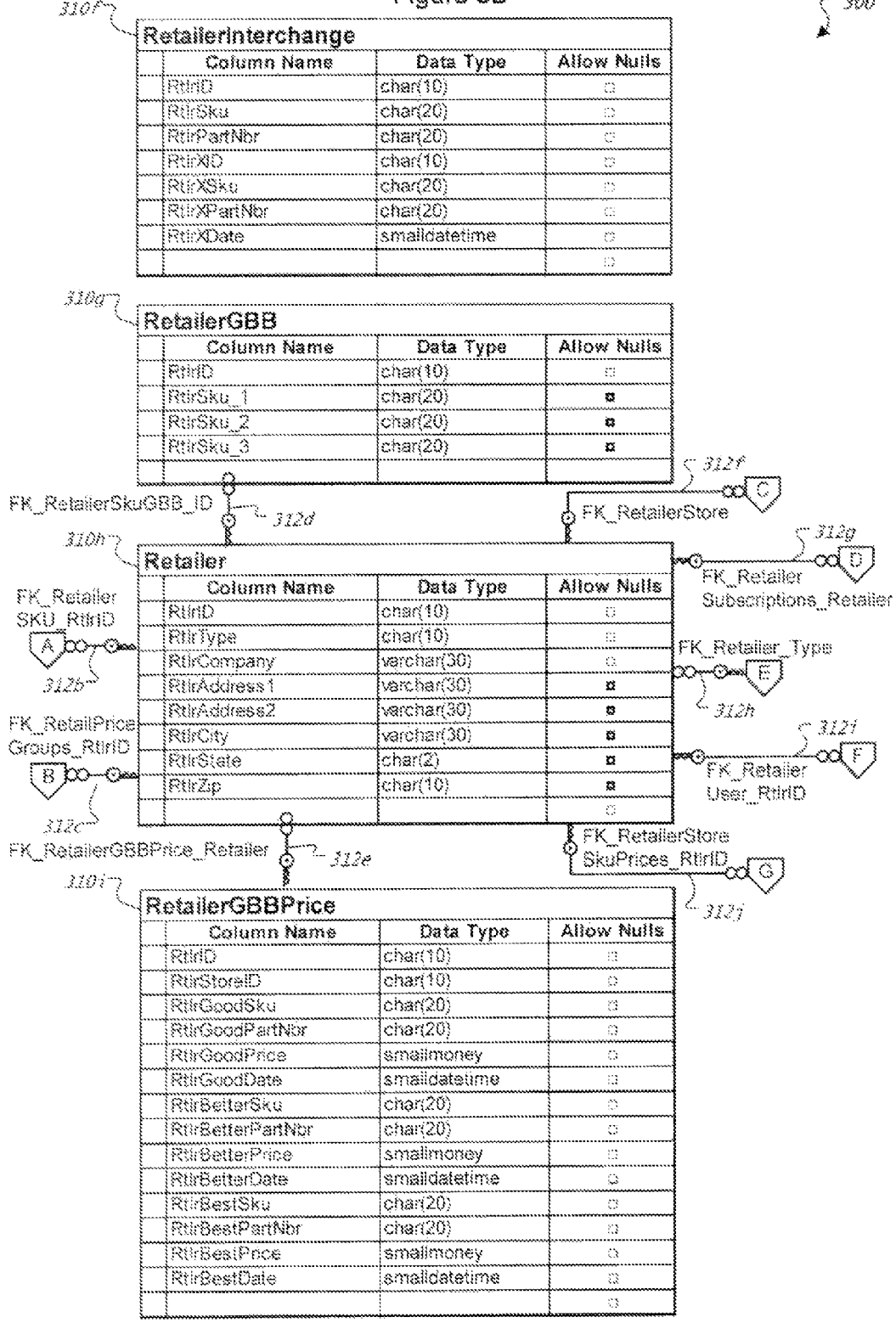

FIG. 3 illustrates a data schema 300 for storing and/or associating pricing information in accordance with some implementations of the present disclosure. Data schema 300 is describe with respect to system 200 of FIG. 2, but data schema 300 could be used by any other system. Moreover, system 200 may use any other schema for storing and/or associating pricing information. System 200 may also use schema with additional pricing information, less pricing information, and/or different pricing information, so long as the pricing information enables mapping between units sold by different retailers.

At a high level, data schema includes tables 310a-n and association links 312a-j. In the illustrated implementation, tables 310 include columns and rows and the intersection of which forms cells. The cells contain information associated with units for sale by retailers 112. Each table 310 includes three columns identifying the data that may be entered into the table 310 and the type of data that may be entered. The tables 310 may each be associated with a different aspect of the pricing information. In the illustrated implementation, tables 310 may include information associated with one or more of the following aspects: sub-categories for products, categories of products, product identification, price group, business segment, and/or pricing. Links 312 indicate associations between the different tables 310. For example, link 312a illustrates the association between table 310a and 310b. In this case, table 310b provides information associated with categories and table 310a provides information associated with sub-categories of the categories identified in table 310b. Regardless, the Retail Retriever Table illustrated below provides example parameters, descriptions, and parameter examples for tables 310a-n.

Retail Retriever Table

| Table Name | Column Name | Description | Examples |
|---|---|---|---|
| Retailer 310h | RtrID | Short Abbreviation for Retailer | AZ, PEP, CSK |
|  | RtrType | Code to identify the retailer's business segment | Auto Aftermarked Pharmaceuticals |
|  | RtrCompany |  |  |
|  | RtrAddress1 |  |  |
|  | RtrAddress2 |  |  |
|  | RtrCity |  |  |
|  | RtrState |  |  |
|  | RtrZip |  |  |
|  | RtrLastPriceUpdate | Last date that the retailer supplied pricing data |  |
| RetailerType 310l | RtrType | Code to identify the retailer's business segment | Auto Aftermarked Pharmaceuticals |
|  | RtrTypeDescription |  |  |
| RetailerUser 310m | RtrID | Short Abbreviation for Retailer | AZ, PEP, CSK |
|  | RtrUserID | System Login name provided for user | javerill , jbrown |
|  | RtrUserPassword | System Login Password for the user |  |

-continued

Retail Retriever Table

| Table Name | Column Name | Description | Examples |
|---|---|---|---|
| | RtrUserName | Full Name of the user | Jim Averill |
| | RtrUserEmail | E-mail address for the user | javerill@retreatnever.com |
| RetailerSubscriptions 310k | RtrID | Short Abbreviation for Retailer | AZ, PEP, CSK |
| | RtrXID | RtrID of competitor for which this retailer has subscribed | |
| | RtrSubscriptionBeginDate | | |
| | RtrSubscriptionEndDate | | |
| | RtrSubscriptionRate | Billing rate for this subscription | |
| RetailerCategory 310h | RtrID | Short Abbreviation for Retailer | AZ, PEP, CSK |
| | RtrCategoryID | Short Abbreviations for Product Categories | Starters, Alternators |
| | RtrCategoryDescription | | |
| RetailerSubCategory 310s | RtrID | Short Abbreviation for Retailer | AZ, PEP, CSK |
| | RtrCategoryID | Short Abbreviations for Product Categories | Starters, Alternators |
| | RtrSubCategoryID | Short Abbreviations for Product Sub-Categories | Imports, Domestic |
| | RtrCategoryDescription | | |
| RetailerProduct 310c | RtrID | Short Abbreviation for Retailer | AZ, PEP, CSK |
| | RtrSku | Unique Product Stock Keeping Unit Identifier | 123897 |
| | RtrPartNbr | Product Part Number | A1234,09-1203 |
| | RtrCategoryID | Short Abbreviations for Product Categories | Starters, Alternators |
| | RtrSubcategoryID | Short Abbreviations for Product Sub-Categories | Imports, Domestic |
| | RtrBrand | Product Brand Name | SuperStart, ProLine |
| | RtrGB6 | Product Level Number | 0-9999 |
| | RtrWnty | Abbreviations for length of Product Warranty | 1 YR, LT (Lifetime) |
| | RtrABC | ABC Marketting Product ranking | A, B, C . . . D |
| | RtrUdf1 | User Definable Field | |
| | RtrUdf2 | User Definable Field | |
| RetailerInterchange 310f | RtrID | Short Abbreviation for Retailer | AZ, PEP, CSK |
| | RtrPartNbr | Product Part Number | A1234 US-1203 |
| | RtrXID | RtrID of competitor for which this retailer has subscribed | |
| | RtrXPartNbr | Competitor's Corresponding Product Part Number | Z-9987, 45-8754 |
| | RtrXDate | Date this interchange provided or updated | |
| RetailerGBB 310g | RtrID | Short Abbreviation for Retailer | AZ, PEP, CSK |
| | RtrPartNbr_0 | Product Level Number | 0 |
| | RtrPartNbr_1 | Product Level Number | 1 |
| | RtrPartNbr_2 | Product Level Number | 2 |
| | RtrPartNbr_3 | Product Level Number | 3 |
| | RtrPartNbr_4 | Product Level Number | 4 |
| RetailerStore 310i | | | |

The Retail Retriever Table identified above are for illustration purposes only. The Retail Retriever Table may include the same, some, or different parameters, descriptions, and/or examples without departing from the scope of this disclosure.

FIGS. 4A-F are example displays for presenting various pricing information through GUI 228 in accordance with some implementations of system 200. It will be understood that illustrated display pages 428a-428f, respectively, are for example purposes only. Accordingly, GUI 228 may include or present data in any format or descriptive language and each page may present any appropriate data in any layout without departing from the scope of the disclosure.

Figure 4A:
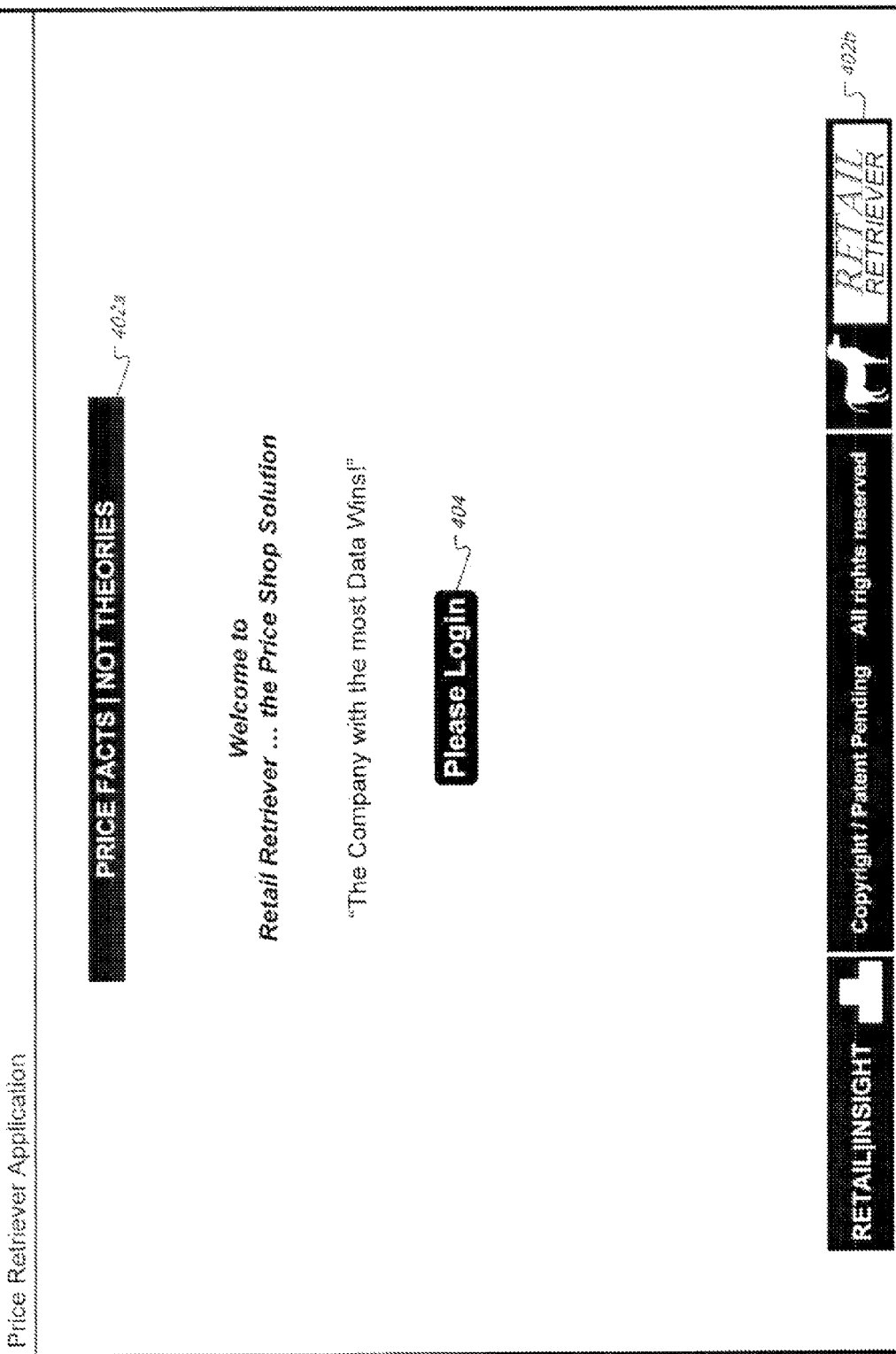

Referring to FIG. 4A, display 428a comprises an initial screen presented to subscriber 202. In the illustrated implementation, display 428a includes banners 402a and 402b for presenting text (e.g., company name, slogans) and images (e.g., trademark). In addition to the displayed information, which is commonly referred to as a Welcome screen, display 428a includes a graphical button 404 for providing access to mapping server 118.

Figure 4B:
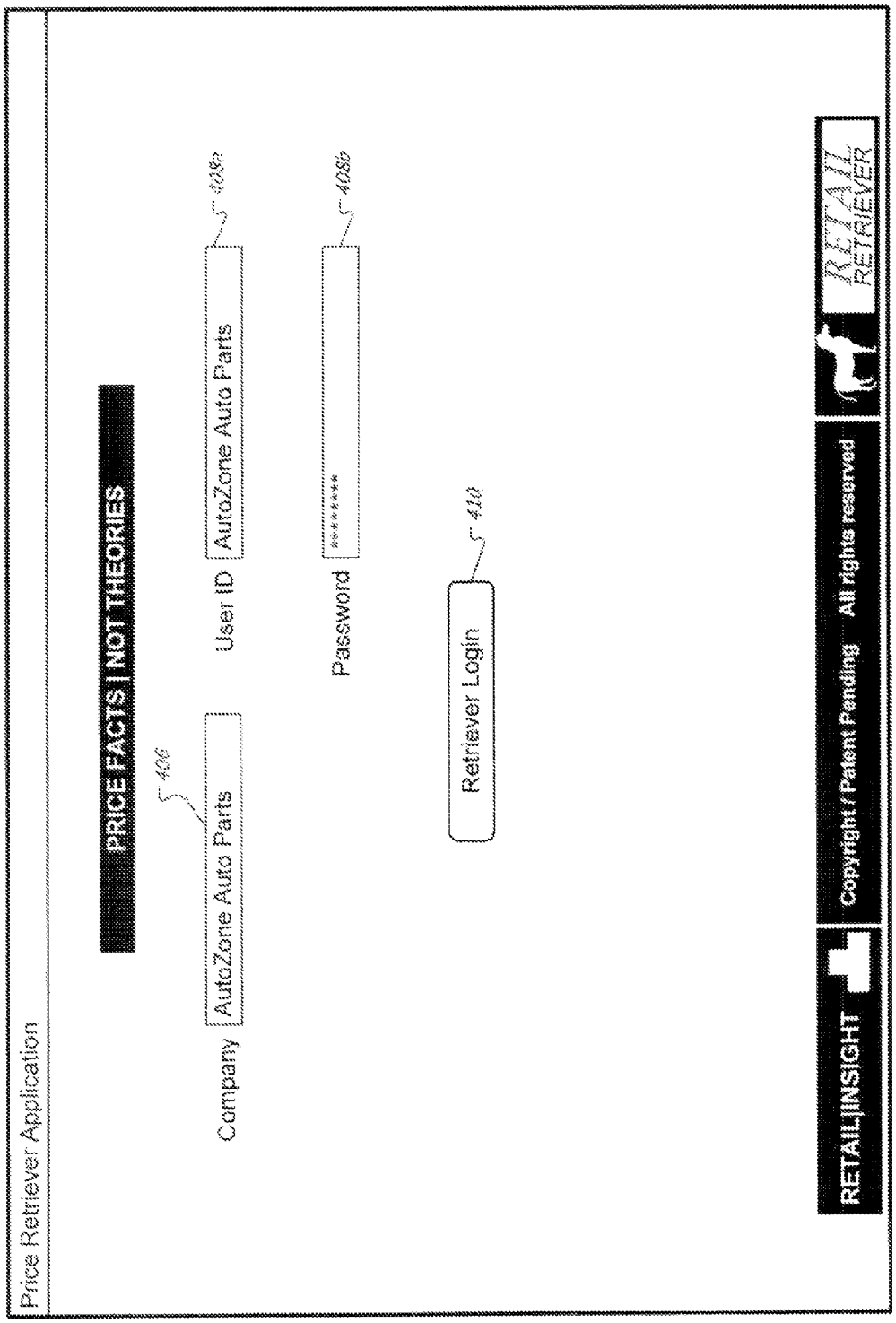

Referring to FIG. 4B, display 428b provides a login screen for the user of subscriber 202. In the illustrated implementation, display 428h includes a dropdown menu 406, fields 408a and 408b, and a graphical button 410. The user may select an associated company through a dropdown menu 406. For example, the user may be an employee of the selected company. In addition, the user may provide a user identification (ID) and a password in fields 408a and 408b, respectively. In connection with entering the appropriate information, the user may initiate the login process by selecting the graphical button 410. In doing so, request engine 222 may verify the user prior to providing access to pricing information.

Figure 4C:

Referring to FIG. 4C, display 428c provides a screen for selecting search criteria for pricing information. Display 428c includes a category selection menu 412, a sub-category selection menu 414, retailer selection boxes 416, filter selection boxes 418, part fields 420, and search buttons 422. Category selection menu 412 presents one or more categories that the user may select. In response to the selection, sub-category 414 presents one or more sub-categories associated with the category selected in menu 412. Retailer selection boxes 416 may enable the user to select one or more retailers 112. For example, of a subscriber 202 intends to evaluate pricing information associated with all retailers 112, all boxes 416 are selected. Part fields 420 enables the user to provide information regarding the part such as; part number, city, state, zip code, MSA, and store number.

Referring to FIG. 4D, display 428d presents a summary of pricing information as a result of the search criteria specified in display 428c. In the illustrated implementation, display 428d includes a summary table 424. Summary table 424 includes three rows and five columns. The intersection of a row and column form a cell that contains pricing information. The five columns are labeled: product level, O'Reilly Auto Part, Advance Auto Parts, AutoZone Auto Parts, and CSK Auto. Besides the product level column, the remaining columns correspond to the retailers 112 selected in the retailer selection boxes 416. The product level column indicates the quality level assigned by the mapping files 216 associated with subscriber 202. In the case that the product is mapped to one or more products in a certain product level, summary table 424 presents a table including pricing information associated with the corresponding products. In the illustrated implementation, the cell table includes price, store number, part number, and brand.

Referring to FIG. 4E, display 428e may present additional pricing information as compared with summary table 424. In the illustrated implementation, display 428e includes detailed table 426. The columns of detailed table 426 may correspond to the filter selection boxes 418 selected in display 428c. In some implementations, the user may select a cell table in display 428d, and in response to the selection, GUI 228 may present detailed table 426. In other words, the user may drilled down to evaluate more pricing information associated with a retailer 112.

Referring to FIG. 4F, display 428f may present pricing information of a plurality of retailers 112. In the illustrated embodiment, display 428f includes comparison table 430. Comparison table 430 several rows and several columns. Each row in comparison table 430 is associated with a retailer's product, and a subset of the columns include prices for corresponding products sold by different retailers 112. As a result, the user may directly compare prices of competing products. In some implementations, GUI 228 presents display 428f in response to a user selecting the search button 422 labeled "View Comparison" in display 428c.

FIG. 5 is a flow diagram illustrating an example method 500 for providing publicly available retail pricing information. Methods 500 is described with respect to system 100 of FIG. 1 and system 200 of FIG. 2, but method 500 could be used by any other system or components. Moreover, systems 100 and/or 200 may use any other suitable techniques for performing these tasks. Thus, many of the steps in this flowchart may take place simultaneously and/or in different orders as shown. Further, systems 100 and/or 200 may execute logic implementing techniques similar to method 500 in parallel or in sequence. Systems 100 and 200 may also use methods with additional steps, fewer steps, and/or different steps, so long as the methods remain appropriate.

At a high level, method 500 includes two process: (1) receiving and storing pricing information provided by retailers 112 in steps 502 to 512; and (2) mapping a product to one or more products to evaluate competing pricing information. Method 500 begins at step 502 where a subscription request is received. For example, mapping server 118 may receive a request from an auto parts retailer 112 to subscribe to pricing-information services. At step 504, one or more accounting files associated with the subscriber are generated. In the example, mapping server 118 may identify information associated with the auto parts retailer 112 (e.g., name, address, store number) and generate one or more associated accounting files 218. A request for pricing and/or mapping information is transmitted to the subscriber at step 506. Again turning to the example, in the event subscriber 202 is a retailer 112, mapping server 118 may transmits a request for both pricing and mapping information. Otherwise, mapping server 118 may only transmit a request for mapping information. At step 508, pricing and/or mapping information is received. In the example, mapping server 118 may receive pricing and mapping information from retailer 112. Next, at step 510, a mapping file is generated based, at least in part, on the received mapping information. As for the example, mapping server 118 may generate one or more mapping files 216 associated with subscriber 202 based, at least in part, on the received mapping information. At step 512, one or more pricing files are generated in the event that the subscriber is associated with a retailer. In the example, mapping server 118 generates one or more pricing files 214 associated with retailer 112 based, at least in part, on the received pricing information.

Turning to the mapping process, method 500 starts at step 514 where a request for pricing information is received. In the example described above, request engine 222 may receive a request for pricing information from subscriber 202. At step 516, one or more accounting files associated with the subscriber is identified. Turning to the example, request engine 222 may identify one or more accounting files 218 associated with the requesting subscriber 202. If the requesting subscriber is a retailer at decisional step 518, then execution proceeds to decisional step 520. As for the example, if subscriber 202 is associated with a retailer 112, then request engine 222 may determine if the associated pricing information is current. If the pricing information is not current at decisional step 520, then, at step 522, a request to update the pricing information is transmitted to the retailer. In the example, in the event the pricing information associated with retailer 112 is not current, request engine 222 may prevent subscriber 202 from accessing pricing information until the retailer's pricing information is current. Otherwise, execution proceeds to step 524. Mapping files associated with the subscriber are identified at step 524. Turning to the example, mapping engine 224 may identify one or more mapping files 216 associated with the requesting subscriber 202. At step 526, a product is identified using the information request. In the example, mapping engine 224 may identify a product using the information request (e.g., SKU). Next, at step 528, the identified product is mapped to one or more corresponding products using the mapping files associated with the subscriber. Again returning to the example, mapping engine 224 may map the identified product to products associated with different retailers using the identified mapping files 216. Pricing files associated with the corresponding products is identified at step 530. As for the example, mapping engine 224 may identify one or more pricing files 214 associated with the corresponding products. Using the identified pricing files, pricing information of the corresponding products is identified at step 532. In the example, mapping engine 224 identifies pricing information of the corresponding products using pricing files 214. At step 534, a display is identified using the information request. Turning to the example, request engine 222 may identify a type of request (e.g., comparison, summary, detailed) using the information request and identify one or more display pages 220 associated with the type of request. Next, at step 536, the display is populated with the appropriate pricing information. As for the example, request engine 22 may populate the display pages 220 with the pricing information prior to transmitting the display pages 220 to subscriber 202. At step 538, the populated display is transmitted to the subscriber.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for providing pricing information, comprising:

receiving, from a first subscriber at a computing device, a request for pricing information of one or more retailers, the request associated with a unit provided by a different retailer from the one or more retailers, wherein the first subscriber comprises the different retailer from the one or more retailers;

identifying, at the computing device, pricing information associated with the unit based on mapping information, the pricing information provided by the one or more retailers, and the mapping information mapping the unit to one or more units sold by the one or more retailers;

identifying a period of time associated with the different retailer and a date the different retailer updated pricing information associated with the different retailer;

determining the different retailer violates the identified period of time based, at least in part, on the identified date;

transmitting a request to the different retailer to update the associated pricing information; and denying the different retailer access to the pricing information associated with the one or more retailers.

2. The method of claim 1, wherein identifying pricing information comprises:
mapping the unit to corresponding units sold by the one or more retailers using the mapping information; and
identifying pricing information associated with the corresponding units using the pricing information provided by the one or more retailers.

3. The method of claim 2, the unit is different from the corresponding units.

4. The method of claim 1, the method further comprising:
generating a display including at least a portion of the identified pricing information; and transmitting the display to the subscriber.

5. The method of claim 1, further comprising receiving mapping information from each of a plurality of subscribers, at least a portion of the mapping information for each of the subscribers comprising different mapping information.

6. The method of claim 1, denying a first subscriber of the plurality of subscribers access to mapping information associated with a second subscriber of the plurality of subscribers, the first subscriber different from the second subscriber.

7. The method of claim 1, the unit is different from the one or more units sold by the one or more retailers.

8. An apparatus providing pricing information comprising computer readable instructions embodied on non-transitory media executed by a processor causing the processor to perform operations comprising:
receive, from a first subscriber, a request for pricing information of one or more retailers, the request associated with a unit provided by a different retailer from the one or more retailers, wherein the first subscriber comprises the different retailer from the one or more retailers;
identify pricing information associated with the unit based on mapping information, the pricing information provided by the one or more retailers, and the mapping information mapping the unit to one or more units sold by the one or more retailers;
identify a period of time associated with the different retailer and a date the different retailer updated pricing information associated with the different retailer;
determine the different retailer violates the identified period of time based, at least in part, on the identified date;
transmit a request to the different retailer to update the associated pricing information; and
deny the different retailer access to the pricing information associated with the one or more retailers.

9. The apparatus of claim 8, the operations comprising:
map the unit to corresponding units sold by the one or more retailers using the mapping information; and
identify pricing information associated with the corresponding units using the pricing information provided by the one or more retailers.

10. The apparatus of claim 8 the operations comprising:
generate a display including at least a portion of the identified pricing information; and transmit the display to the subscriber.

11. The apparatus of claim 8, the operations comprising:
receive mapping information from each of a plurality of subscribers, at least a portion of the mapping information for each of the subscribers comprising different mapping information.

12. The apparatus of claim 8, the operations comprising:
deny a first subscriber of the plurality of subscribers access to mapping information associated with a second subscriber of the plurality of subscribers, the first subscriber different from the second subscriber.

13. A server for providing pricing information comprising:
one or more processors configured to:
receive, from a first subscriber at the server, a request for pricing information of one or more retailers, the request associated with a unit provided by a different retailer from the one or more retailers, wherein the first subscriber comprises the different retailer from the one or more retailers;
identify, at the server, pricing information associated with the unit based on mapping information, the pricing information provided by the one or more retailers, and the mapping information mapping the unit to one or more units sold by the one or more retailers;
identify a period of time associated with the different retailer and a date the different retailer updated pricing information associated with the different retailer;
determine the different retailer violates the identified period of time based, at least in part, on the identified date;
transmit a request to the different retailer to update the associated pricing information; and
deny the different retailer access to the pricing information associated with the one or more retailers.

14. The server of claim 13 the one or more processors configured to:
map the unit to corresponding units sold by the one or more retailers using the mapping information; and
identify pricing information associated with the corresponding units using the pricing information provided by the one or more retailers.

15. The server of claim 13 the one or more processors configured to:
generate a display including at least a portion of the identified pricing information; and transmit the display to the subscriber.

16. The server of claim 13 the one or more processors configured to receive mapping information from each of a plurality of subscribers, at least a portion of the mapping information for each of the subscribers comprising different mapping information.

17. The server of claim 13 the one or more processors configured to: deny a first subscriber of the plurality of subscribers access to mapping information associated with a second subscriber of the plurality of subscribers, the first subscriber different from the second subscriber.

* * * * *

UNITED STATES PATENT AND TRADEMARK OFFICE
CERTIFICATE OF CORRECTION

| | | |
|---|---|---|
| PATENT NO. | : 7,979,323 B2 | Page 1 of 1 |
| APPLICATION NO. | : 11/621004 | |
| DATED | : July 12, 2011 | |
| INVENTOR(S) | : Jack Brown | |

It is certified that error appears in the above-identified patent and that said Letters Patent is hereby corrected as shown below:

In column 15, lines 29-32, delete
"4. The method of claim 1, the method further comprising:
generating a display including at least a portion of the identified pricing information; and transmitting the display to the subscriber." and insert
-- 4. The method of claim 1, the method further comprising:
generating a display including at least a portion of the identified pricing information; and transmitting the display to the subscriber. -- therefor.

In Claim 10, column 16, line 7, delete "claim 8" and insert -- claim 8, -- therefor.

In Claim 14, column 16, line 44, delete "claim 13" and insert -- claim 13, -- therefor.

In Claim 15, column 16, line 51, delete "claim 13" and insert -- claim 13, -- therefor.

In Claim 16, column 16, line 56, delete "claim 13" and insert -- claim 13, -- therefor.

In Claim 17, column 16, line 61, delete "claim 13" and insert -- claim 13, -- therefor.

Signed and Sealed this
Twenty-fifth Day of October, 2011

David J. Kappos
*Director of the United States Patent and Trademark Office*